United States Patent
Rofka et al.

(10) Patent No.: US 8,843,293 B2
(45) Date of Patent: Sep. 23, 2014

(54) METHOD FOR CONTROLLING A GAS TURBINE IN A POWER PLANT AND POWER PLANT FOR CARRYING OUT THE METHOD

(75) Inventors: Stefan Rofka, Nussbaumen (CH); Andreas Rueter, Baden (CH); Klaus Doebbeling, Windisch (CH); Martin Nicklas, Baden (CH)

(73) Assignee: Alstom Technology Ltd., Baden (CH)

( * ) Notice: Subject to any disclaimer, the term of this patent is extended or adjusted under 35 U.S.C. 154(b) by 996 days.

(21) Appl. No.: 12/330,154

(22) Filed: Dec. 8, 2008

(65) Prior Publication Data

US 2009/0150040 A1 Jun. 11, 2009

(30) Foreign Application Priority Data

Dec. 10, 2007 (CH) .................................. 1917/07

(51) Int. Cl.
F02C 9/00 (2006.01)
F02C 9/54 (2006.01)
(52) U.S. Cl.
CPC ............. *F02C 9/54* (2013.01); *F05D 2270/303* (2013.01); *F05D 2270/112* (2013.01)
USPC ................. 701/100; 60/773; 60/794
(58) Field of Classification Search
USPC ................... 60/39.3, 773, 775, 794; 701/100
See application file for complete search history.

(56) References Cited

U.S. PATENT DOCUMENTS

| 4,297,841 | A  | * | 11/1981 | Cheng ............................ 60/39.3 |
| 4,428,194 | A  | * | 1/1984  | Stokes et al. .................... 60/779 |
| 4,660,375 | A  | * | 4/1987  | Hyde et al. ...................... 60/773 |
| 6,167,690 | B1 | * | 1/2001  | Hepner et al. ................... 60/773 |
| 6,708,497 | B2 | * | 3/2004  | Doebbeling et al. ............ 60/775 |
| 7,117,662 | B2 | * | 10/2006 | Hirayama et al. ........... 60/39.27 |
| 7,293,415 | B2 |   | 11/2007 | Hoffmann et al. |
| 2004/0255595 | A1 | * | 12/2004 | Morgan et al. ................... 60/773 |
| 2006/0010876 | A1 | * | 1/2006  | Hoffmann et al. .............. 60/773 |
| 2006/0218930 | A1 | * | 10/2006 | Nuding et al. .................. 60/775 |
| 2009/0150040 | A1 | * | 6/2009  | Rofka et al. .................... 701/100 |
| 2009/0301097 | A1 |   | 12/2009 | Deuker et al. |

FOREIGN PATENT DOCUMENTS

| CA | 2608042    | A1 | 11/2006 |
| CN | 1771385    | A  | 5/2006  |
| DE | 2109215    | A1 | 9/1972  |
| DE | 10260992   | A1 | 7/2004  |
| EP | 1724528    | A  | 11/2006 |
| WO | 2004072453 | A  | 8/2004  |
| WO | 2006120206 | A1 | 11/2006 |
| WO | 2008003571 | A2 | 1/2008  |

\* cited by examiner

*Primary Examiner* — Stephen Holwerda
(74) *Attorney, Agent, or Firm* — Buchanan Ingersoll & Rooney PC

(57) ABSTRACT

With a method for controlling a gas turbine in a power plant, a multiplicity of operating lines for the gas turbine for different gas turbine inlet temperatures TIT or gas turbine exhaust temperatures TAT and positions of the compressor inlet guide vane cascade VIGV are specified as a function of the load. For minimizing the electricity production costs during operation switching can be optionally carried out between different operating lines during constant or varying power output of the power plant.

2 Claims, 3 Drawing Sheets

_US 8,843,293 B2_

METHOD FOR CONTROLLING A GAS TURBINE IN A POWER PLANT AND POWER PLANT FOR CARRYING OUT THE METHOD

FIELD OF INVENTION

The present invention refers to the field of power plant technology and relates to a method for controlling a gas turbine in a power plant, with which method a prespecified rating or variation of the gas turbine inlet temperature (TIT) or gas turbine exhaust temperature (TAT) and of the position of one or more variable inlet guide vane cascades (VIGV) is specified for each load. A power plant for carrying out the method also lies within the scope of the invention.

BACKGROUND

The output of a gas turbine can be adjusted by altering the turbine inlet temperature, the compressor inlet mass flow, or both parameters. For adjusting the compressor inlet mass flow, for example the inlet geometry of the compressor can be altered via a variable inlet guide vane cascade.

The level of the turbine inlet temperature essentially determines the service life consumption or the length of the inspection interval of the gas turbine.

The efficiency of the gas turbine is essentially determined by the pressure ratio which with constant turbine inlet temperature progresses proportionally to the compressor inlet volume.

The output of a gas turbine is essentially determined by the level of the turbine inlet temperature. The gas turbine exhaust temperature is directly proportional to the level of the turbine inlet temperature and inversely proportional to the pressure ratio of the gas turbine.

The efficiency of a combined gas and steam turbine power plant, that is to say of a so-called combined cycle power plant, is dependent upon the level of the gas turbine exhaust temperature and upon the gas turbine efficiency. From this, it follows that the overall efficiency and the output of a combined cycle power plant is essentially dependent upon the gas turbine inlet temperature.

Nowadays, gas turbines are controlled so that a prespecified rating of gas turbine inlet or exhaust temperature/compressor inlet guide vane cascade position, or the variation of the temperatures for predetermined compressor inlet guide vane cascade positions, is associated with each load.

Minimizing the electricity production costs in the sense of a flexible adaptation of gas turbine inlet temperature and/or of the position of the compressor inlet guide vane cascade is possible only in the case of a new commissioning during which the corresponding rating or variation of the gas turbine inlet temperature or gas turbine exhaust temperature and of the position of the compressor inlet guide vane cascade is established for achieving specific maximum or minimum load values or as a function of the load. If, for example in the case of an increase of the fuel price, the wish should be to reduce the efficiency with simultaneous extension of the service life and consequently of the maintenance interval with constant electric power output, a new commissioning of the gas turbine would be necessary for this.

SUMMARY

The present disclosure is directed to a method for controlling a gas turbine in a power plant. The method includes rating a gas turbine inlet temperature (TIT) or gas turbine exhaust temperature (TAT) and specifying a position of at least one variable compressor inlet guide vane cascades (VIGV) for each load. The method also includes specifying a multiplicity of operating lines for the gas turbine for different gas turbine inlet temperatures TIT or gas turbine exhaust temperatures TAT and positions of the compressor inlet guide vane cascade VIGV as a function of the load, and for minimizing electricity production costs during operation. The method further includes carrying out switching optionally between the different operating lines during constant or varying power output of the power plant.

The present disclosure is also directed to a power plant, including at least one gas turbine with a compressor, a turbine, and a control unit. The control unit specifies a multiplicity of operating lines for the at least one gas turbine for different gas turbine inlet temperatures TIT or gas turbine exhaust temperatures TAT as well as positions of the compressor inlet guide vane cascade VIGV as a function of the load. To minimize electricity production costs during operation, switching is optionally carried out between different operating lines during constant or varying power output of the power plant.

BRIEF DESCRIPTION OF THE DRAWINGS

Further advantages, features and details of the invention result from the preferred exemplary embodiments which originate from the following consideration and also with reference to the drawing. Schematically in the drawing

DETAILED DESCRIPTION OF THE PREFERRED EMBODIMENTS

Introduction to the Embodiments

The invention is therefore based on the object of creating a method for controlling a power plant which is based on a gas turbine and which even without new commissioning enables a flexible adaptation of gas turbine inlet temperature and/or of the position of the compressor inlet guide vane cascade.

The achieving of the object according to the invention is brought about by a multiplicity of operating lines for the gas turbine being specified for different gas turbine inlet temperatures TIT or gas turbine exhaust temperatures TAT and for positions of the compressor inlet guide vane cascade VIGV as a function of the load, and for minimizing the electricity production costs during operation by switching being optionally carried out between the different operating lines during constant or varying power output of the power plant.

The operating concept according to the invention gives to the power plant operator the possibility of minimizing the electricity production costs at any time according to requirements.

The electricity production costs essentially depend upon subsequent costs and revenues which arise as a result of the operation of a power plant, specifically as a result of the fuel costs per generated kWh of current which are to be paid for by the power plant, the level of which is determined by the efficiency of the gas turbine, the revenue which is generated by the power plant as a result of the sale of electric power, and the service life consumption, i.e. the costs for servicing and maintenance of the gas turbine.

The flexible gas turbine operating concept according to the invention enables optimization of the operating mode with regard to minimizing the electricity production costs. In so doing, switching can be carried out during operation between different turbine inlet temperatures and positions of the compressor inlet guide vane cascade during constant or varying power generation.

DETAILED DESCRIPTION

Figure 1:
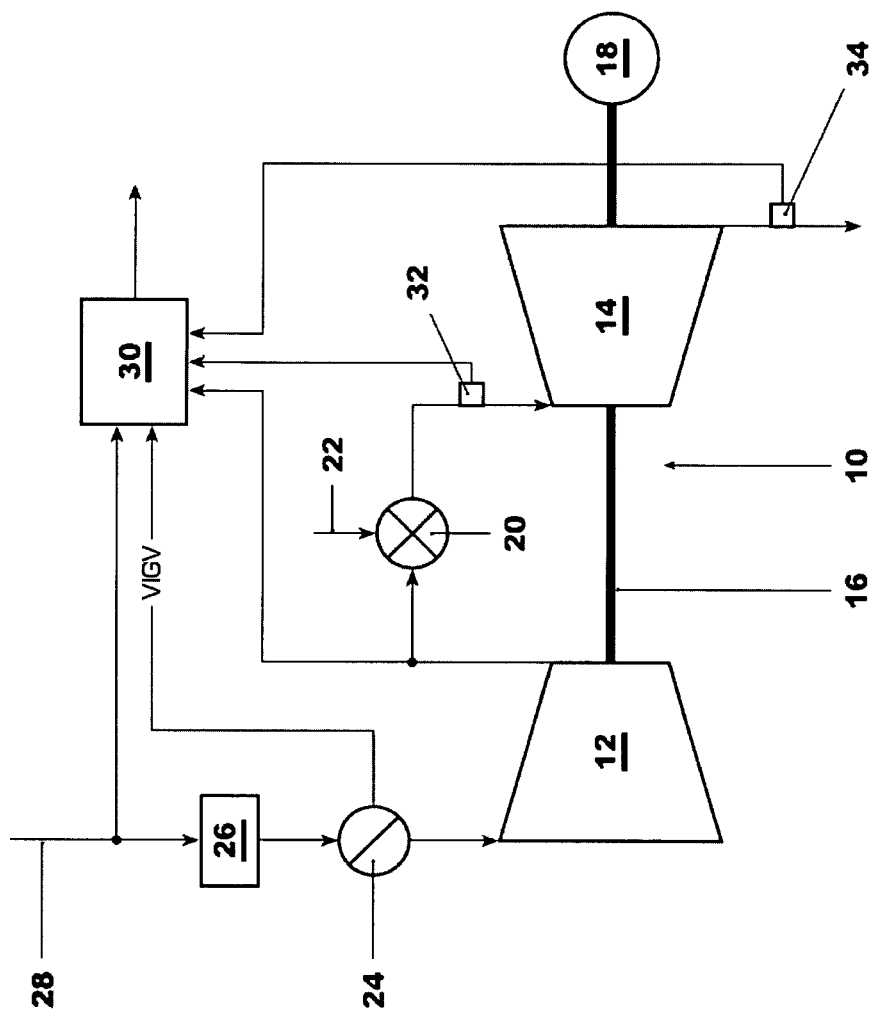
FIG. 1 shows a simplified block schematic diagram for a power plant with a gas turbine.

A gas turbine 10, which comprises a compressor 12, a combustion chamber 20 and a turbine 14, and which is a central component part, is to be seen in a power plant which is reproduced in FIG. 1. Compressor 12 and turbine 14 are arranged on a common shaft 16 which drives a generator 18. Via an air inlet 28, a filter 26 and a variable guide vane arrangement 24, the compressor 12 draws in air from the environment, compresses it and transmits the thus compressed air via a plenum to the combustion chamber 20 where it is used for the combustion of a fuel (liquid or gaseous) which is fed via a fuel feed line 22. The resulting hot gas is expanded in the turbine 14, performing work, and can then be used for example in a subsequent heat recovery steam generator for generating process steam or steam for a steam turbine.

For controlling the overall plant (gas turbine and other components), a control unit 30 is provided which is represented in the figure as a simple block with one output, but in reality can be configured in a very complex manner and with many outputs for the various plant components.

A multiplicity of operating lines in each case in the form of a prespecified rating or variation of the gas turbine inlet temperature TIT or gas turbine exhaust temperature TAT and of the position or of the incidence angle of a variable compressor inlet guide vane cascade VIGV, which are determined for each load or for the upper and lower limiting values of the load when commissioning the gas turbine 10, are stored in a data memory which is associated with the control unit 30.

For establishing the operating lines, basic parameters of the gas turbine 10 are used, in fact especially the incidence angle VIGV of the variable guide vane arrangement 24 and the turbine inlet temperature TIT at the inlet of the turbine 14. For input of the incidence angle VIGV, a connecting line between the variable guide vane arrangement 24 and an input of the control unit 30 is provided in the figure. The turbine inlet temperature TIT is determined via a corresponding transducer 32 which is arranged between the outlet of the combustion chamber 20 and the inlet of the turbine 14, and via a line is transmitted to another input of the control unit 30, wherein the turbine inlet temperature is TIT=f (pressure upstream of the turbine or pressure downstream of the compressor, TAT, VIGV). The turbine exhaust temperature TAT is used to determine from it by computer the turbine inlet temperature TIT. For this purpose, a corresponding transducer 34 is arranged at the exhaust of the turbine 14 and connected to an input of the control unit 30.

Figure 2:
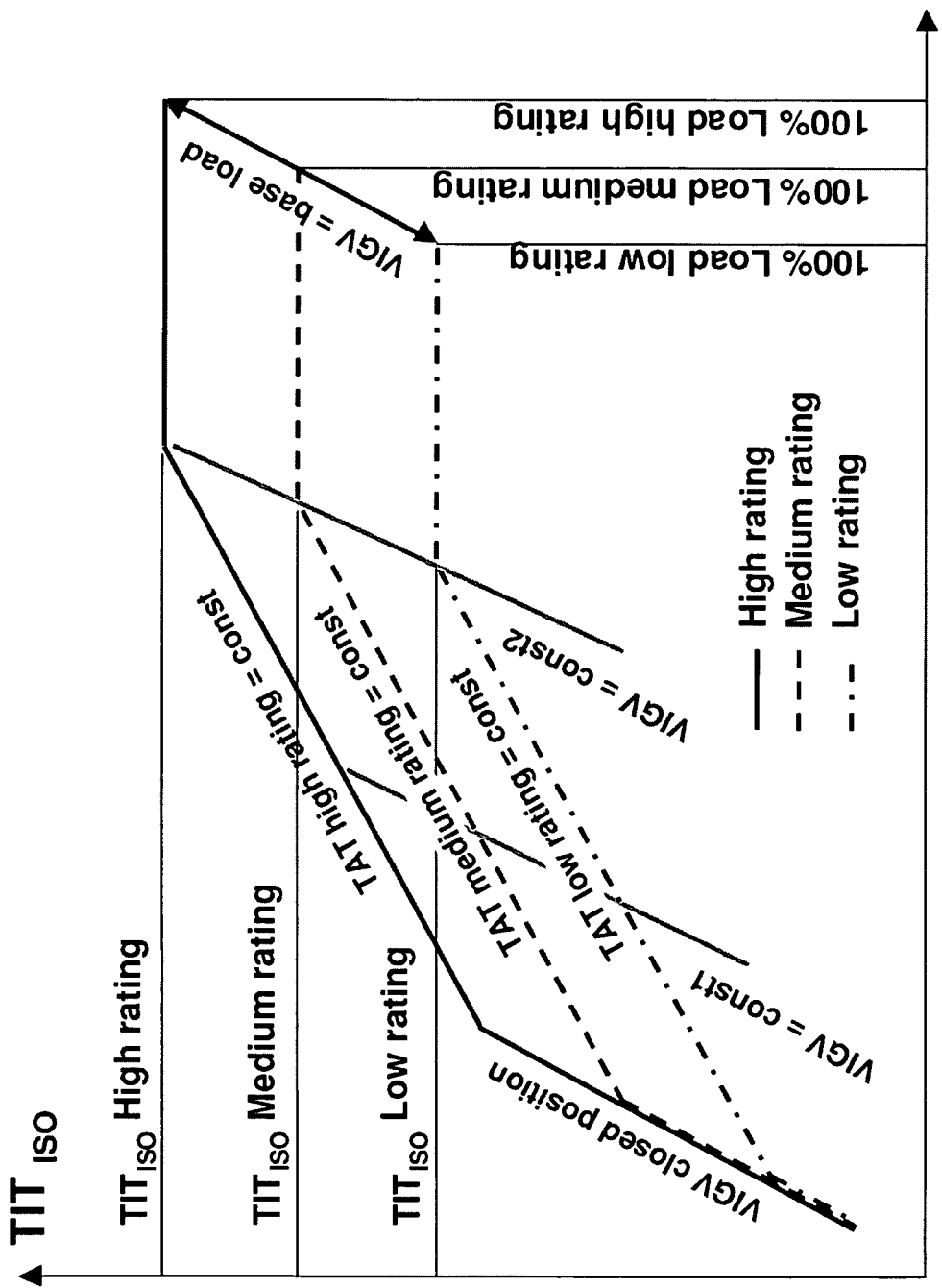
FIG. 2 shows different operating lines of a gas turbine for different gas turbine inlet temperatures (TIT) with different positions of the compressor inlet guide vane cascade (VIGV) in a function of the load and FIG. 3 is a flow diagram depicting the method of the present invention.
Figure 3:
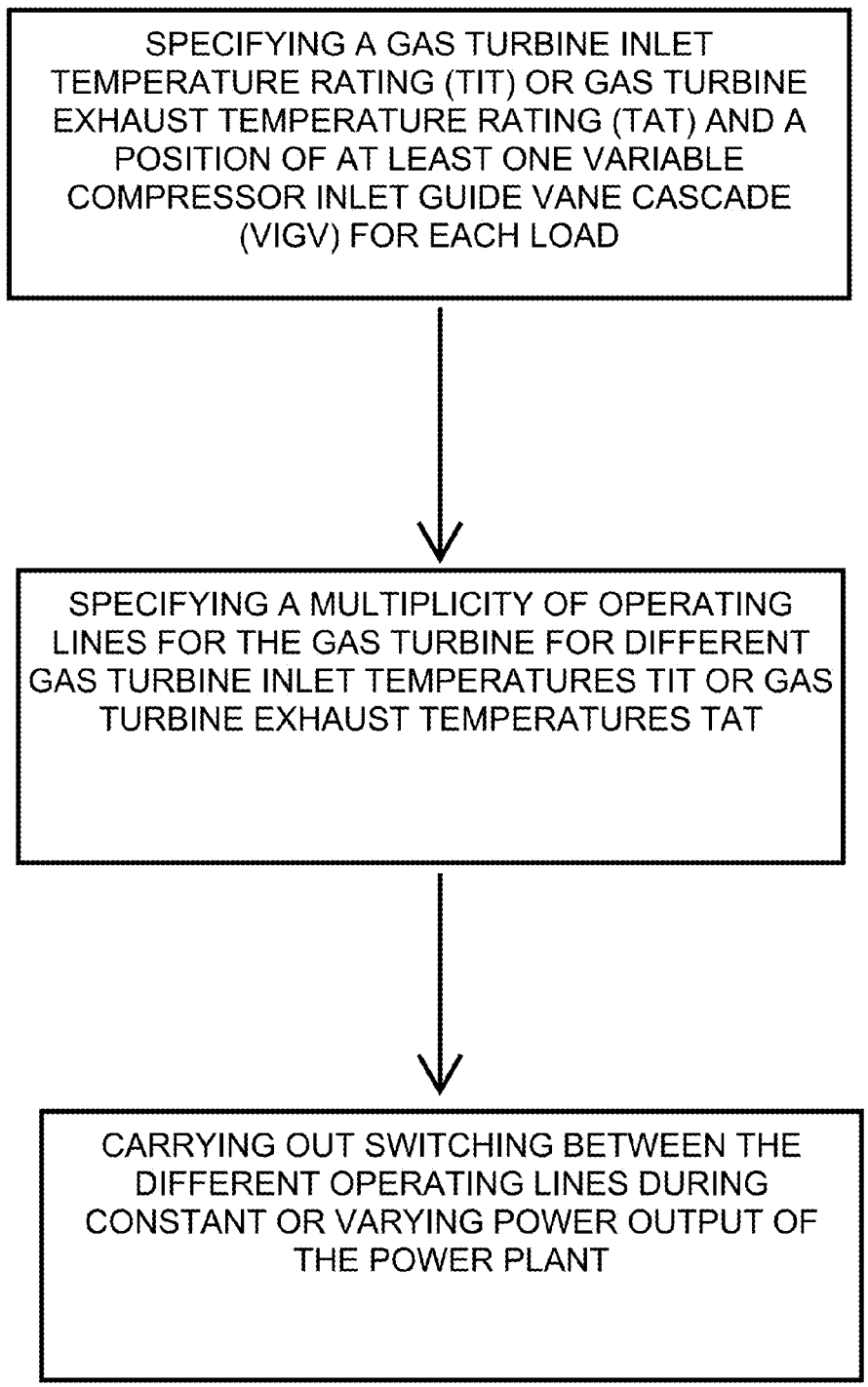

In the case of the operating concept which is shown in FIG. 2, in addition to a base load operation three further operating states are recorded at varying levels of partial load. With an inlet guide vane cascade incidence angle VIGV="at base load position", and an operation at high partial load, an inlet guide vane cascade incidence angle VIGV="closed position" is provided. An output-specific service life is to be ensured. For this purpose, output-specific turbine inlet temperatures TIT are established which at full load lead to three different service lives or inspection intervals, which inspection intervals are defined according to a "standard (SP) or long (LP) or extra-long (ELP) time interval", wherein SP to LP to ELP for example are like 1 to 1.5 to 2. The three operating lines take into consideration three different turbine inlet temperatures TIT in base load operation and in operation at high partial load. A seamless load change between different outputs becomes possible.

In the case of the operating concept which is shown in FIG. 2, three possible operating lines are shown. For all three operating lines the TIT is shown as a function of the load. For calculating the TIT, different possibilities are known. The TIT ISO which is shown is a theoretical temperature which would result when mixing the hot gases with all the cooling air flows at the end of the combustion chamber (according to ISO 2314:1989).

At low load, all the operating lines are limited by the minimum position of the VIGV, that is to say the VIGV closed position. The operating lines at low load lie correspondingly one above the other, and an increase of the output is achieved by a raising of the TIT until a TAT which corresponds to the selected operating line is achieved. Depending upon the selected operating line (SP, LP, ELP), loading is carried out up to the corresponding TAT value, that is to say to the TAT low rating, TAT medium rating or TAT high rating. As soon as the respective TAT value is achieved, with a further load increase the VIGV is opened in proportion to the load and the TAT held constant. The respective load, which can be achieved with a specific VIGV position, for example with VIGV=const1, in this case is proportional to the TIT of the selected operating line (SP, LP, ELP).

With the opening of the VIGV, the mass flow through the gas turbine, the pressure ratio across the turbine 14, and therefore the temperature ratio across the turbine 14, increase. With constant TAT, the TIT is increased in proportion to the opening of the VIGV. This is carried out until the maximum TIT which is associated with the respective operating line (SP, LP, ELP), that is to say the TIT low rating, the TIT medium rating or the TIT high rating, is achieved. As soon as the maximum TIT or TIT base load is achieved, the load is controlled only via the VIGV, and the TIT held constant. Since the mass flow increases further with opening of the VIGV, the TAT (not shown) falls until reaching base load.

In the example which is shown, the ratios of TIT to TAT values for the different operating lines (SP, LP, ELP) are selected so that the transition from constant TAT to maximum TIT is carried out in each case with the same VIGV position, that is to say VIGV=const2. In the example, a similar variation of the cooling air pressure ratios over the TIT or TAT is therefore ensured for all the operating lines (SP, LP, ELP). The service life factors are thus kept equal for all the load ratios in a first approximation. Another selection of the vertices, however, is conceivable, depending upon design and optimization aim. With the different operating lines (SP, LP, ELP), the specific service life is ensured in each case. For this purpose, output-specific turbine exhaust temperatures TAT and TIT are controlled in pairs as a function of the load. The VIGV can be used as a control parameter or be specified as a function of the load. The three specific service lives in base load and partial load operation lead to three different inspection intervals which for example correspond to inspection intervals of specified periods in dependence upon the established operating hours.

A seamless load change between different operating lines is made possible by a corresponding raising or lowering of the TIT/TAT. For this purpose, the TIT/TAT for example are raised or lowered with constant gradients. The gradient to which the TIT or TAT is adapted for example is selected in the order of magnitude of a TIT or TAT gradient which is required for a load change along an operating line with a normal load gradient. The inspection intervals result when changing between the operating lines in conformance with the time portions which are covered on the respective operating lines.

LIST OF DESIGNATIONS

10 Gas turbine
12 Compressor
14 Turbine
16 Shaft
18 Generator
20 Combustion chamber
22 Fuel feed line
24 Variable guide vane arrangement
26 Filter
28 Air inlet
30 Control unit
32 Transducer (turbine inlet temperature TIT)
34 Transducer (turbine exhaust temperature TAT)
SP Standard period, inspection interval operating period 1 with TIT high rating
LP Long period, inspection interval operating period 1.5 with TIT medium rating
ELP Extra-long period, inspection interval operating period 2 with TIT low rating
TIT high rating Standard turbine inlet temperature for inspection interval SP
TIT medium rating Slightly lowered turbine inlet temperature for inspection interval LP
TIT low rating Lowered turbine inlet temperature for inspection interval ELP
TIT Turbine inlet temperature
TAT Turbine exhaust temperature
VIGV Incidence angle of the variable guide vane arrangement
VIGV closed position Smallest opening of the VIGV for no-load operation and low partial load
VIGV const1 Example at which load and TIT for different operating lines a VIGV opening angle is achieved
VIGV const2 VIGV angle at which the TIT base load for different operating lines is achieved
L Load

What is claimed is:

1. A method for controlling a gas turbine in a power plant, comprising:
specifying a gas turbine inlet temperature rating (TIT) or gas turbine exhaust temperature rating (TAT) and a position of at least one variable compressor inlet guide vane cascade (VIGV) for each load;
specifying a multiplicity of operating lines for the gas turbine for different gas turbine inlet temperatures (TIT) or gas turbine exhaust temperatures (TAT) and positions of the compressor inlet guide vane cascade (VIGV) as a function of the load, each of the operating lines respectively corresponding to a period of operation or inspection interval based on respectively different TIT in a range of a base load operation UP to and including an operation at high partial load;
minimizing electricity production costs during operation by carrying out switching between the different operating lines during constant or varying power output of the power plant;
achieving a service life improvement by controlling, in pairs, output-specific gas turbine exhaust temperature (TAT) and turbine inlet temperature (TIT) as a function of the load for each of the different operating lines, such that a ratio of the corresponding pair of output-specific TIT and TAT for each of the different operating lines is increased or decreased with a constant gradient based on a corresponding same VIGV position for each of the different operating lines; and
reducing an efficiency of the gas turbine by selection of one of the operating lines with a low TIT (TIT low rating) or low TAT (TAT low rating).

2. A power plant, comprising:
at least one gas turbine with a compressor having an inlet guide vane cascade (VIGV);
a turbine; and
a control unit, the control unit being configured to specify a multiplicity of operating lines for the at least one gas turbine for different gas turbine inlet temperatures (TIT) or gas turbine exhaust temperatures (TAT) as well as positions of the compressor inlet guide vane cascade (VIGV) as a function of the load, each of the operating lines respectively corresponding to a period of operation or inspection interval based on respectively different TIT in a range of a base load operation up to and including an operation at high partial load;
wherein for minimizing electricity production costs during operation, the control unit is configured to institute switching between different operating lines during constant or varying power output of the power plant, and
wherein output-specific gas turbine exhaust temperature (TAT) and turbine inlet temperature (TIT) are controlled in pairs as a function of the load for each of the different operating lines, such that a ratio of the corresponding pair of output-specific TIT and TAT for each of the different operating lines is increased or decreased with a constant gradient based on a corresponding same VIGV position for each of the different operating lines, and an efficiency of the gas turbine is reduced by selection of an operating line with a low TIT (TIT low rating) or low TAT (TAT low rating) in order to achieve a service life improvement.

* * * * *